United States Patent
Luton, Jr.

(10) Patent No.: US 7,165,383 B1
(45) Date of Patent: Jan. 23, 2007

(54) TRIMMER ATTACHMENT FOR MOWER DECK

(76) Inventor: James J. Luton, Jr., 307 Helfer La., Minoa, NY (US) 13116

( * ) Notice: Subject to any disclaimer, the term of this patent is extended or adjusted under 35 U.S.C. 154(b) by 239 days.

(21) Appl. No.: 10/603,237

(22) Filed: Jun. 24, 2003

(51) Int. Cl.
*A01D 34/84* (2006.01)
(52) U.S. Cl. .......................................... 56/12.7; 56/13.7
(58) Field of Classification Search ................. 56/12.7, 56/13.7, 16.7
See application file for complete search history.

(56) References Cited

U.S. PATENT DOCUMENTS

| | | | | |
|---|---|---|---|---|
| 4,281,505 A | * | 8/1981 | Fuelling et al. ............... | 56/12.7 |
| 4,663,920 A | * | 5/1987 | Skovhoj ....................... | 56/12.7 |
| 5,040,360 A | * | 8/1991 | Meehleder .................... | 56/11.6 |
| 5,477,665 A | * | 12/1995 | Stout ............................ | 56/16.7 |
| 5,966,914 A | * | 10/1999 | Reents ......................... | 56/16.7 |
| 6,094,896 A | * | 8/2000 | Lane ............................ | 56/13.7 |
| 6,966,168 B1 | * | 11/2005 | Kerr, Sr. ....................... | 56/12.7 |

* cited by examiner

*Primary Examiner*—Meredith C. Petravick

(57) ABSTRACT

A trimmer attachment for mower deck having a servo connectable to a lawn mower deck. The servo is capable of angular actuation. A line trimmer is connected to the servo. The line trimmer has a bottom side. The line trimmer is capable of feeding line upon tapping the line trimmer bottom side upon a surface. A line feed switch is connected to the servo. The line feed switch is capable of actuating the servo downward and upward to tap the line trimmer bottom side upon a surface.

4 Claims, 3 Drawing Sheets

TRIMMER ATTACHMENT FOR MOWER DECK

BACKGROUND OF THE INVENTION

1. Field of the Invention

The present embodiment of the invention relates to a trimmer attachment for mower deck for use in connection with lawn trimmers. The trimmer attachment for mower deck has particular utility in connection with lawn trimmer that is servo controlled.

2. Description of the Prior Art

Trimmer attachment for mower decks are desirable for reducing time necessary to do yard work by simultaneously trimming while mowing a lawn.

The use of lawn trimmers is known in the prior art. For example, U.S. Pat. No. 4,453,372 to Remer discloses a universal grass edger and trimmer attachment is disclosed utilizing a rotary flexible drive shaft whose operating end is supported by a multi-positional boom. However, the Remer '372 patent does not include a servo control for height and a servo control button to tap the trimmer on the ground for line feed.

Similarly, U.S. Pat. No. 5,065,566 to Gates discloses a trimmer attachment for mower deck for trimming around trees and other objects simultaneously with mowing. A pivotal boom projects laterally from the mower deck and carries one or more trimming heads which rotate flexible lines using motive power supplied by the tractor. The boom deflects when it encounters a tree and is able to trim around more than 180.degree. of the tree circumference. A tension spring returns the boom to its normal lateral position after the tree has been cleared. The boom can be swung upwardly for compact storage by a power cylinder. However, the Gates '566 patent does not include a servo control for height and a servo control button to tap the trimmer on the ground for line feed.

Lastly, U.S. Pat. No. 5,560,189 to Devillier et al. discloses an edging and trimming lawn mower apparatus that includes a mower assembly having a blade rotating within a horizontal plane for cutting grass. A trimmer assembly extends laterally of the mower assembly for trimming grass. An edger assembly similarly projects laterally of the mower assembly and includes an edging blade rotating in a vertical plane for cutting grass adjacent a solid object. However, the Devillier et al. '189 patent does not include a servo control for height and a servo control button to tap the trimmer on the ground for line feed.

While the above-described devices fulfill their respective, particular objectives and requirements, the aforementioned patents do not describe a trimmer attachment for mower deck that allows lawn trimmer that is servo controlled. The Remer '372, Gates '566 and Devillier et al. '189 patents make no provision for a servo control for height and a servo control button to tap the trimmer on the ground for line feed.

Therefore, a need exists for a new and improved trimmer attachment for mower deck which can be used for lawn trimmer that is servo controlled. In this regard, the present embodiment of the invention substantially fulfills this need. In this respect, the trimmer attachment for mower deck according to the present embodiment of the invention substantially departs from the conventional concepts and designs of the prior art, and in doing so provides an apparatus primarily developed for the purpose of lawn trimmer that is servo controlled.

SUMMARY OF THE INVENTION

In view of the foregoing disadvantages inherent in the known types of lawn trimmers now present in the prior art, the present embodiment of the invention provides an improved trimmer attachment for mower deck, and overcomes the above-mentioned disadvantages and drawbacks of the prior art. As such, the general purpose of the present embodiment of the invention, which will be described subsequently in greater detail, is to provide a new and improved trimmer attachment for mower deck and method which has all the advantages of the prior art mentioned heretofore and many novel features that result in a trimmer attachment for mower deck which is not anticipated, rendered obvious, suggested, or even implied by the prior art, either alone or in any combination thereof.

To attain this, the present embodiment of the invention essentially comprises a servo connectable to a lawn mower deck. The servo is capable of angular actuation. A line trimmer is connected to the servo. The line trimmer has a bottom side. The line trimmer is capable of feeding line upon tapping the line trimmer bottom side upon a surface. A line feed switch is connected to the servo. The line feed switch is capable of actuating the servo downward and upward to tap the line trimmer bottom side upon a surface.

There has thus been outlined, rather broadly, the more important features of the embodiment of the invention in order that the detailed description thereof that follows may be better understood and in order that the present contribution to the art may be better appreciated.

The present embodiment of the invention may also include a support arm, a bearing assembly, a control panel, a trimmer power switch, a servo raise lower switch and a servo angle switch. There are, of course, additional features of the present embodiment of the invention that will be described hereinafter and which will form the subject matter of the claims attached.

Numerous objects, features and advantages of the present embodiment of the invention will be readily apparent to those of ordinary skill in the art upon a reading of the following detailed description of presently preferred, but nonetheless illustrative, embodiments of the present embodiment of the invention when taken in conjunction with the accompanying drawings. In this respect, before explaining the current embodiment of the embodiment of the invention in detail, it is to be understood that the embodiment of the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present embodiment of the invention.

It is therefore an object of the present embodiment of the invention to provide a new and improved trimmer attachment for mower deck that has all of the advantages of the prior art lawn trimmers and none of the disadvantages.

It is another object of the present embodiment of the invention to provide a new and improved trimmer attachment for mower deck that may be easily and efficiently manufactured and marketed.

An even further object of the present embodiment of the invention is to provide a new and improved trimmer attachment for mower deck that has a low cost of manufacture with regard to both materials and labor, and which accordingly is then susceptible of low prices of sale to the consuming public, thereby making such trimmer attachment for mower deck economically available to the buying public.

Still another object of the present embodiment of the invention is to provide a new trimmer attachment for mower deck that provides in the apparatuses and methods of the prior art some of the advantages thereof, while simultaneously overcoming some of the disadvantages normally associated therewith.

Even still another object of the present embodiment of the invention is to provide a trimmer attachment for mower deck for lawn trimmer that is servo controlled.

Lastly, it is an object of the present embodiment of the invention is to provide a trimmer attachment for mower deck for lawn trimmer that has a servo controlled button which taps the line release head against the ground to feed line to the trimmer.

These together with other objects of the embodiment of the invention, along with the various features of novelty that characterize the embodiment of the invention, are pointed out with particularity in the claims annexed to and forming a part of this disclosure. For a better understanding of the embodiment of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The embodiment of the invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
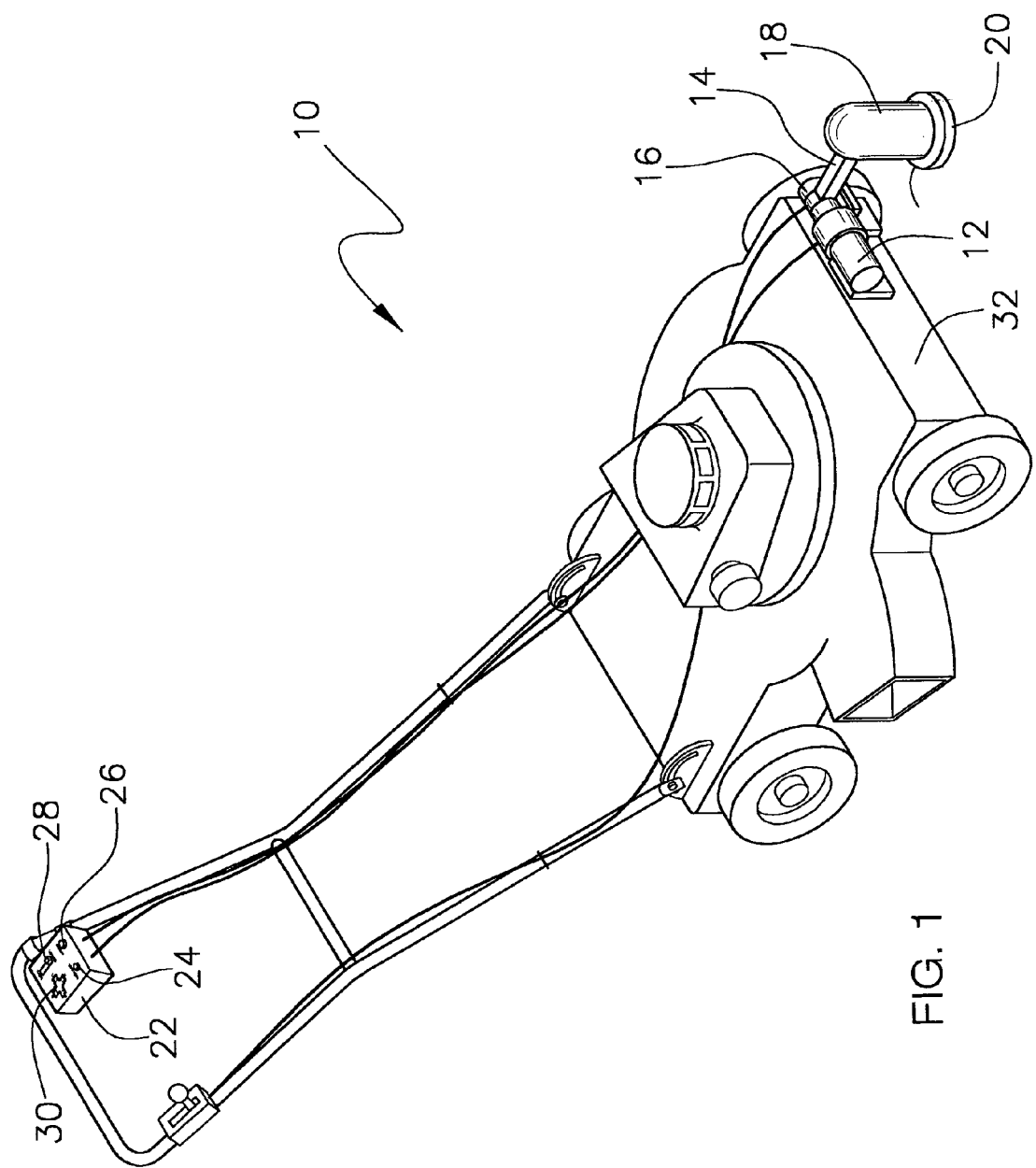
FIG. 1 is a top perspective view of the preferred embodiment of the trimmer attachment for mower deck constructed in accordance with the principles of the present invention.

Referring now to the drawings, and particularly to FIGS. 1–4, a preferred embodiment of the trimmer attachment for mower deck of the present invention is shown and generally designated by the reference numeral 10.

In FIG. 1, a new and improved trimmer attachment for mower deck 10 of the present invention for lawn trimmer that is servo controlled is illustrated and will be described. More particularly, the trimmer attachment for mower deck 10 has a servo 12 connectable to a lawn mower deck 32. The servo 12 is capable of angular actuation. The servo 12 is electrically powered. A support arm 14 is drivingly connected to the servo 12. A bearing assembly 16 is rotatably connected to the support arm 14. The bearing assembly 16 is connected to the lawn mower deck 32. A line trimmer 18 is connected to the support arm 14. The line trimmer 18 has a bottom side 20. The line trimmer 18 is capable of feeding line upon tapping the line trimmer bottom side 20 upon the surface. A line feed switch 24 is connected to the servo 12. The line feed switch 24 is capable of actuating the servo 12 downward and upward to tap the line trimmer bottom side 20 upon the surface. A control panel 22 is connected to the line feed switch 24. A trimmer power switch 26 is connected to the line trimmer 18. The trimmer power switch 26 is connected to the control panel 22. A servo raise lower switch 28 is connected to the servo 12 for actuating the servo 12 through the 90 degree arc. The servo raise lower switch 28 is connected to the control panel 22. The servo raise lower switch 28 is the slider type switch. A servo angle switch 30 is connected to the servo 12 for actuating the servo 12 through angular changes. The servo angle switch 30 is connected to the control panel 22. The servo angle switch 30 is the joystick type switch.

Figure 2:
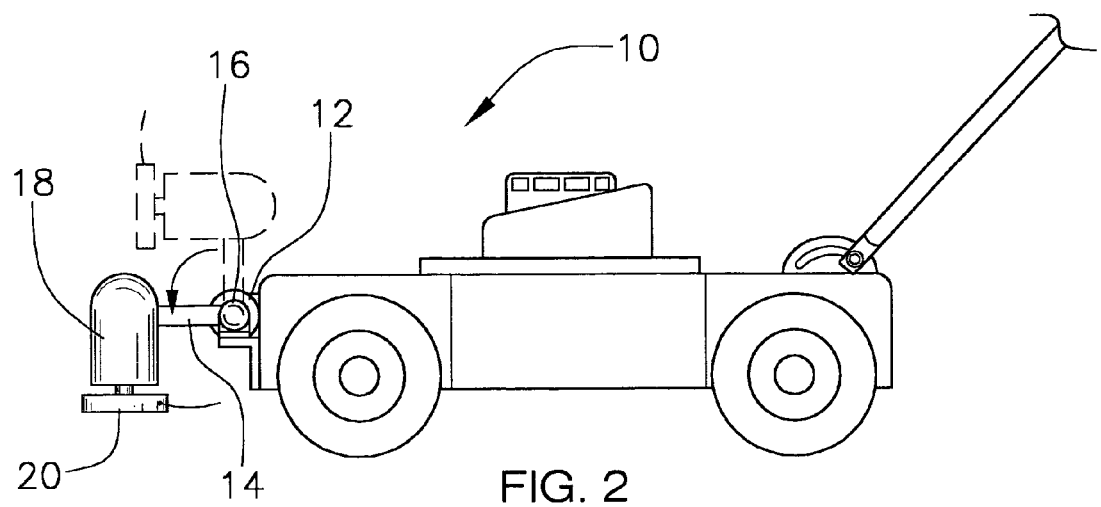
FIG. 2 is a left side view of the trimmer attachment for mower deck of the present embodiment of the invention.

In FIG. 2, the trimmer attachment for mower deck 10 is illustrated and will be described. More particularly, the trimmer attachment for mower deck 10 has the servo 12 connectable to the lawn mower deck 32. The servo 12 is capable of angular actuation. The servo 12 is electrically powered. The support arm 14 is drivingly connected to the servo 12. The bearing assembly 16 is rotatably connected to the support arm 14. The bearing assembly 16 is connected to the lawn mower deck 32. The line trimmer 18 is connected to the support arm 14. The line trimmer 18 has the bottom side 20. The line trimmer 18 is capable of feeding line upon tapping the line trimmer bottom side 20 upon the surface.

Figure 3:
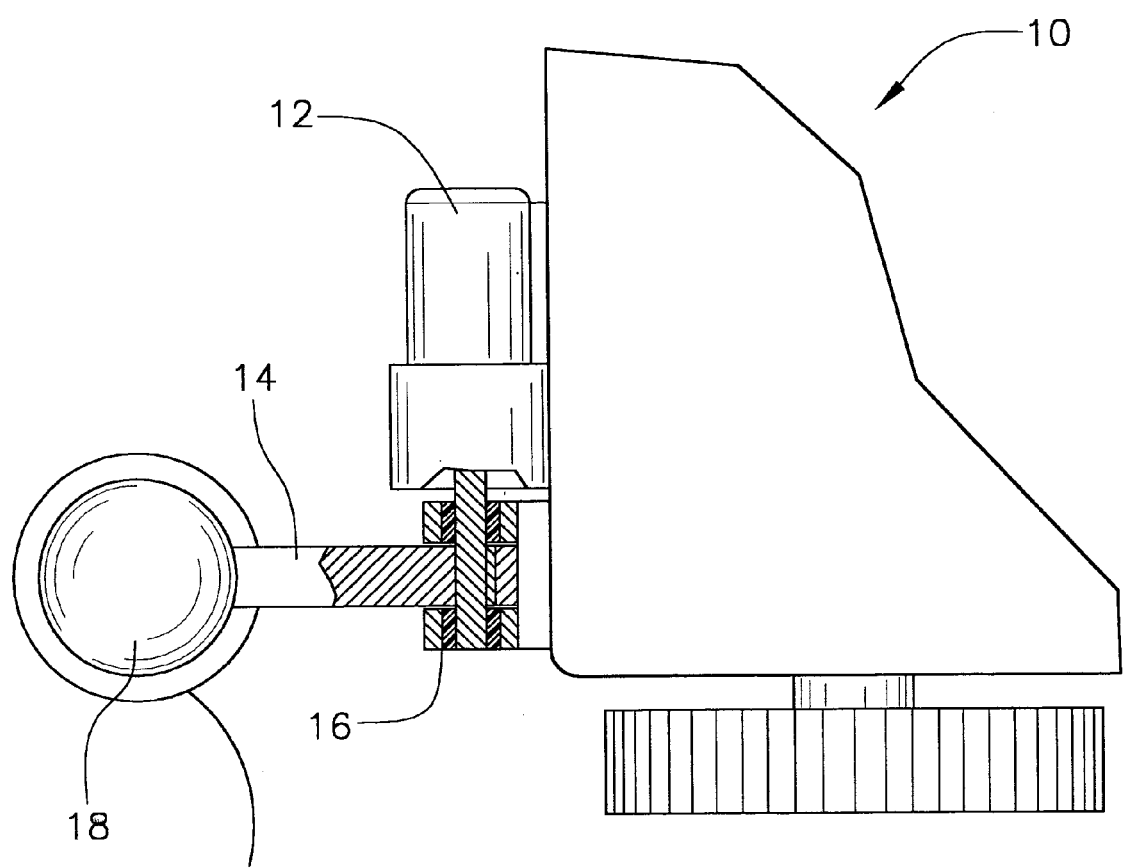
FIG. 3 is a right side view of the trimmer attachment for mower deck of the present embodiment of the invention.

In FIG. 3, the trimmer attachment for mower deck 10 is illustrated and will be described. More particularly, the trimmer attachment for mower deck 10 has the servo 12 connectable to the lawn mower deck 32. The servo 12 is capable of angular actuation. The servo 12 is electrically powered. The support arm 14 is drivingly connected to the servo 12. The bearing assembly 16 is rotatably connected to the support arm 14. The bearing assembly 16 is connected to the lawn mower deck 32. The line trimmer 18 is connected to the support arm 14. The line trimmer 18 has the bottom side 20. The line trimmer 18 is capable of feeding line upon tapping the line trimmer bottom side 20 upon the surface.

Figure 4:
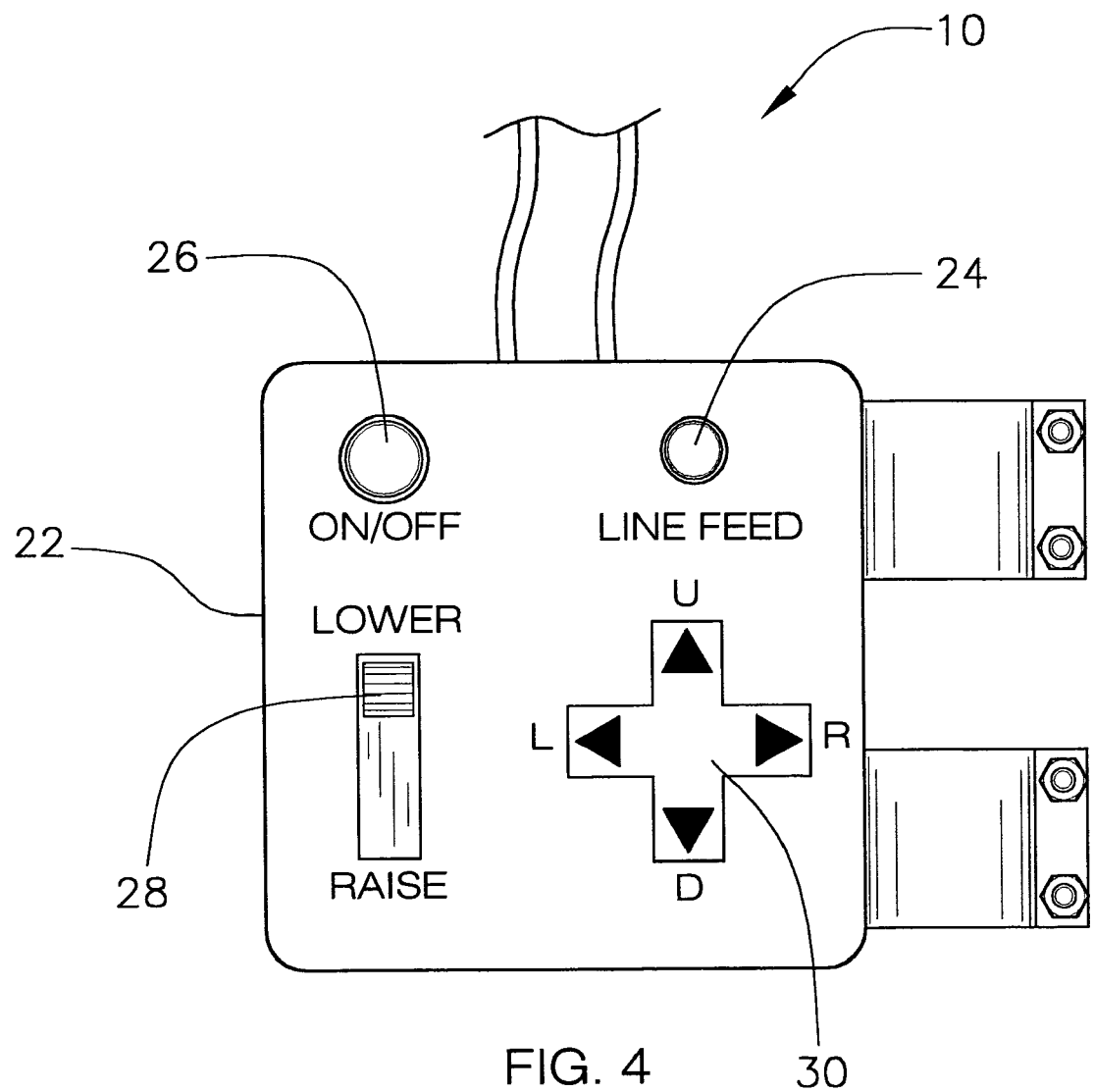
FIG. 4 is a top side view of the trimmer attachment for mower deck of the present embodiment of the invention.

In FIG. 4, the trimmer attachment for mower deck 10 is illustrated and will be described. More particularly, the trimmer attachment for mower deck 10 the line feed switch 24 is connected to the servo 12 (shown in FIG. 1). The line feed switch 24 is capable of actuating the servo 12 downward and upward to tap the line trimmer bottom side 20 upon the surface. The control panel 22 is connected to the line feed switch 24. The trimmer power switch 26 is connected to the line trimmer 18. The trimmer power switch 26 is connected to the control panel 22. The servo raise lower switch 28 is connected to the servo 12 for actuating the servo 12 through the 90 degree arc. The servo raise lower switch 28 is connected to the control panel 22. The servo raise lower switch 28 is the slider type switch. The servo angle switch 30 is connected to the servo 12 for actuating the servo 12 through angular changes. The servo angle switch 30 is connected to the control panel 22. The servo angle switch 30 is the joystick type switch.

In use it can now be understood that the trimmer attachment for mower deck 10 can be used by lowering the trimmer with the servo raise lower switch 28, turning on the line trimmer with the trimmer power switch 26 and adjusting the angle of the cut with the servo angle switch 30. After use, the trimmer can be raised out of the way with the servo raise lower switch 28.

While a preferred embodiment of the trimmer attachment for mower deck has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present embodiment of the invention. For example, any suitable sturdy material such as plastic may be used instead of the metal arm described.

Therefore, the foregoing is considered as illustrative only of the principles of the embodiment of the invention. Further, since numerous modifications and changes will readily occur to those skilled in the art, it is not desired to limit the embodiment of the invention to the exact construction and operation shown and described, and accordingly, all suitable modifications and equivalents may be resorted to, falling within the scope of the embodiment of the invention.

I claim:

1. A trimmer attachment for mower deck comprising:
   a servo connectable to a lawn mower deck, said servo capable of angular actuation;
   a line trimmer connected to said servo, said line trimmer having a bottom side, said line trimmer capable of feeding line upon tapping said line trimmer bottom side upon a surface;
   a line feed switch connected to said servo, said line feed switch capable of actuating said servo downward and upward to tap said line trimmer bottom side upon a surface;
   a servo raise lower switch connected to said servo for actuating said servo through a 90 degree arc; and
   a joystick switch connected to said servo for actuating said servo through angular changes, wherein said angular changes are left, right, up, and down with respect to said lawnmower deck.

2. The trimmer attachment for mower deck of claim 1 wherein:
   said servo raise lower switch is a slider switch.

3. A trimmer attachment for mower deck comprising:
   a servo connectable to a lawn mower deck, said servo capable of angular actuation;
   a support arm drivingly connected to said servo;
   a line trimmer connected to said support arm, said line trimmer having a bottom side, said line trimmer capable of feeding line upon tapping said line trimmer bottom side upon a surface;
   a line feed switch connected to said servo, said line feed switch capable of actuating said servo downward and upward to tap said line trimmer bottom side upon a surface;
   a bearing assembly rotatably connected to said support arm, said bearing assembly connected to said lawn mower deck;
   a control panel connected to said line feed switch;
   a trimmer power switch connected to said line trimmer;
   a servo raise lower switch connected to said servo for actuating said servo through a 90 degree arc, said servo raise lower switch is a slider switch; and
   a joystick switch connected to said servo for actuating said servo through angular changes, wherein said angular changes are left, right, up, and down with respect to said lawnmower deck.

4. A trimmer attachment for mower deck comprising:
   a servo connectable to a lawn mower deck, said servo capable of angular actuation, said servo is electrically powered;
   a support arm drivingly connected to said servo;
   a bearing assembly rotatably connected to said support arm, said bearing assembly connected to said lawn mower deck;
   a line trimmer connected to said support arm, said line trimmer having a bottom side, said line trimmer capable of feeding line upon tapping said line trimmer bottom side upon a surface;
   a line feed switch connected to said servo, said line feed switch capable of actuating said servo downward and upward to tap said line trimmer bottom side upon a surface;
   a control panel connected to said line feed switch;
   a trimmer power switch connected to said line trimmer, said trimmer power switch connected to said control panel;
   a servo raise lower switch connected to said servo for actuating said servo through a 90 degree arc, said servo raise lower switch connected to said control panel, said servo raise lower switch is a slider switch; and
   a joystick switch connected to said servo for actuating said servo through angular changes, said servo angle switch connected to said control panel, wherein said angular changes are left, right, up, and down with respect to said lawnmower deck.

\* \* \* \* \*